C. E. STELLER.
Feed Manger.
No. 45,190. Patented Nov. 22, 1864.
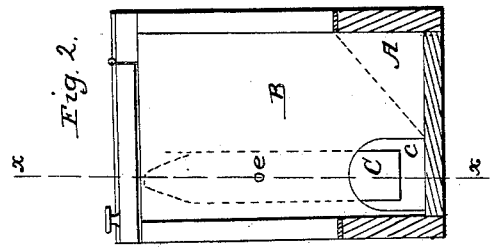
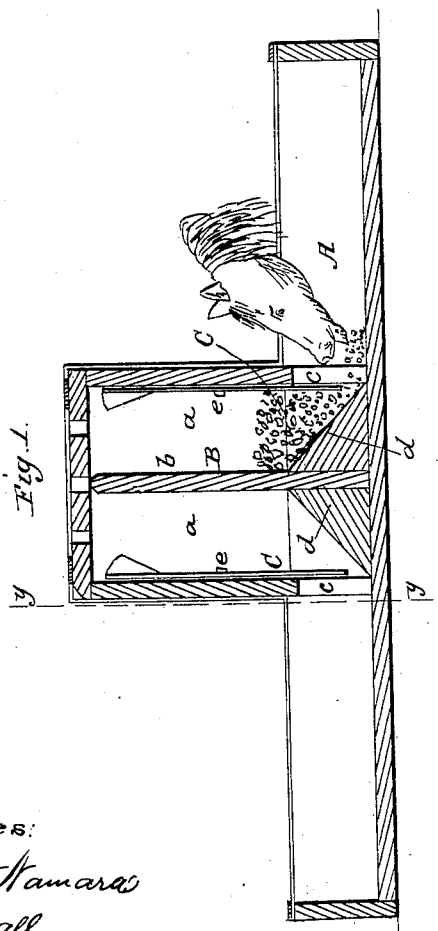
Witnesses:
Inventor:

United States Patent Office.

C. E. STELLER, OF McGREGOR, IOWA.

IMPROVEMENT IN FEED-MANGERS.

Specification forming part of Letters Patent No. 45,190, dated November 22, 1864.

*To all whom it may concern:*

Be it known that I, C. E. STELLER, of McGregor, in the county of Clayton and State of Iowa, have invented a new and Improved Feed-Manger; and I do hereby declare that the following is a full, clear, and exact description thereof, which will enable others skilled in the art to make and use the same, reference being had to the accompanying drawings, making a part of this specification, in which—

Figure 1 is a longitudinal vertical section of my invention, taken in the line $x\ x$, Fig. 2; Fig. 2, a transverse vertical section of the same, taken in the line $y\ y$, Fig. 1.

Similar letters of reference indicate like parts.

The invention also admits of the supply of feed to the manger being regulated as desired, so as to control the rapidity with which the animal may eat. This is an essential feature of the invention, as many animals, especially horses, are liable to eat too rapidly, and not properly masticate their food, and they frequently become choked.

A represents a manger, which may be of rectangular or other form and of any suitable or desired dimensions, and B is a hopper or feed-receptacle placed at the center of the manger and divided into two compartments, $a\ a$, by a vertical partition, $b$. These compartments each communicate with the manger by means of an opening, $c$, at their lower ends, and said compartments are provided with inclined bottoms $d$, which have a tendency to direct the feed toward said openings $c$. (See Fig. 1.)

Within each compartment $a$, at the sides in which the openings $c$ are made, there are fitted plates or valves C, which work on pivots $e$. By adjusting the valves they may be made to serve in a greater or less degree in obstructing the passage of the feed through the openings $c$ into the manger, and consequently an animal may be made to occupy a greater or less time in consuming the feed, as may be desired.

The feed at any time does not escape through the openings $c$ into the manger very rapidly—not faster than it can be eaten—as the removal of the feed from the openings by its consumption causes its discharge; hence there will never be a surplus in the manger.

Although the within description refers to a double arrangement—that is to say, a feed-receptacle provided with two compartments, with a manger at each side—still, the invention can be arranged with a single feed-receptacle.

What I claim as new, and desire to secure by Letters Patent, is—

In combination with the hopper or feed-receptacle B and manger A, a valve, C, or its equivalent, for the purpose of regulating the supply of feed to the manger, as set forth.

C. E. STELLER.

Witnesses:
ELIJAH ODELL,
JAMES REDDING.